Nov. 9, 1926.
F. A. GODDARD
1,606,023
SHOCK ABSORBING DEVICE
Filed July 12, 1924
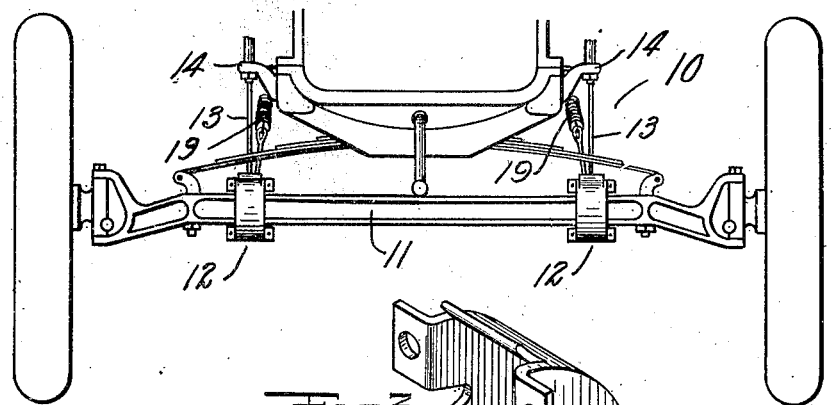
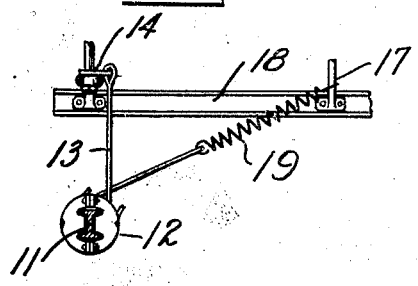
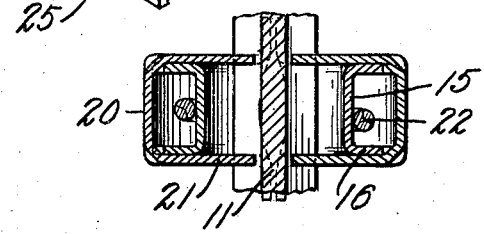
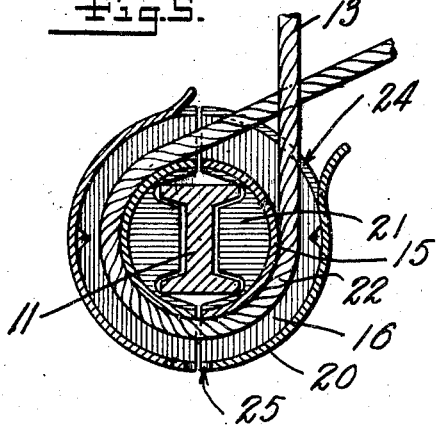
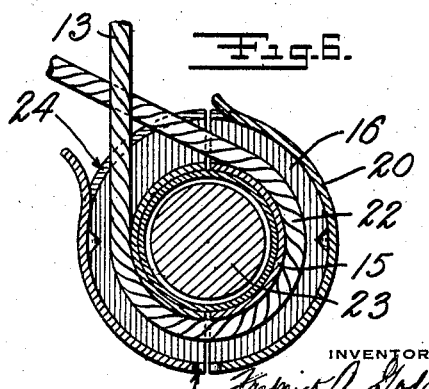
INVENTOR
Frederick A. Goddard
Frank J. Kent
ATTORNEY Patented Nov. 9, 1926.

1,606,023

UNITED STATES PATENT OFFICE.

FREDERICK A. GODDARD, OF NEW YORK, N. Y., ASSIGNOR TO AUTOMOTIVE HARDWARE CORPORATION, OF NEW YORK, N. Y.

SHOCK-ABSORBING DEVICE.

Application filed July 12, 1924. Serial No. 725,588.

This invention relates generally to automobile shock absorbing devices of the snubber type.

The invention is in the nature of an improvement on the invention described and claimed in my prior application Serial No. 700,410, filed March 19, 1924, and includes a drum member adapted to be mounted in enclosing engagement on an axle of the vehicle and around which is passed the coil of a tensile member anchored to the vehicle framework. The tensile member includes a resiliently elongatable portion and a feature of the invention resides in the anchoring of this portion of the tensile member at a point on the vehicle framework spaced a substantial distance longitudinally of the vehicle from the position of the drum member.

Another feature of the present invention is the provision of casings or enclosing and protecting members for the drums and the portions of the tensile members coiled thereon.

Other features of the invention will be hereinafter referred to.

In the drawings in which a preferred embodiment of the invention has been selected for illustration, Figure 1 is a view in front elevation of a portion of an automobile equipped with shock absorbers embodying the invention.

Figure 2 is a view in side elevation showing the position of one of the shock absorbing devices of Figure 1 on the vehicle.

Figure 3 is a view in perspective and on an enlarged scale of one of the casing members shown in Figures 1 and 2.

Figure 4 is a view in horizontal section and on an enlarged scale of one of the encased drum members shown in Figures 1 and 2.

Figure 5 is a view in vertical section of the device shown in Figure 4.

Figure 6 is a view similar to Figure 5 showing the parts adapted for mounting on a rear instead of a front axle.

Referring to the drawings for a more detailed description of the invention, a front elevation view of a vehicle 10 is shown in Figure 1 including a front axle member 11 having an I-beam cross section. Mounted in enclosing relation to the axle 11 is a pair of clutch drums 12 from which tensile members 13 extend for anchoring connection at one end to a bracket 14 on the vehicle framework directly above the axle.

The friction drums shown generally at 12 in Figure 1 of the drawing include friction drum members properly shown at 15 which are formed in two sections having a conformation adapted to fit the contour of the I-beam section of the axle 11 as is clearly shown in Figure 5 of the drawing. The drum member 15 has a U-shaped cross section with outwardly extending lateral flange members 16 as is best shown in Figure 4 of the drawing. The circular channel thus formed is adapted to receive the coil 22 of the tensile member 13 already referred to, the other end of the tensile member being attached at 17 to a point on the vehicle framework 18 spaced a considerable distance longitudinally of the vehicle with relation to the point of support 14 of the vertically extending stretch of the tensile member 13 already mentioned. It will be seen that the end of the tensile member which is attached at the point 17 extends in a position that approaches nearer the horizontal than the vertical, this condition being utilized to facilitate the steadying of the front axle 11 in a steering operation.

In order to provide the necessary elongation of the tensile member to permit of relative movement of the vehicle framework 18 and the axle 11, a spring 19 is interposed in the stretch of tensile member between the drum 12 and the point of anchorage 17 with the vehicle framework.

A cover or casing member 20 for the friction drum 15 is provided. The casing 20 is formed in two sections adapted to be bolted together in enclosing relation to the friction drum 15 and the coil 16 of the tensile member which is wound thereon. The sections of the casing 20 have a U-shape in cross section with the flanges 21 thereof extending radially inward in flanking or enclosing relation to the outwardly extending flanges 16 of the friction drum 15. The relative arrangement of the casing and the friction drum member 15 is such that the inner surface of the peripheral wall of the casing 20 rests against the outer peripheral edge of the flanges 16 of the drum 15. In addition the inner edges of the casing flange members 21 are formed to fit the contour of the axle member on which they are mounted.

It will be seen that the flanges of the casing member 20 shown in Figure 3 of the drawing are formed to fit the I-beam section of the front axle 11, while in Figure 6 of the drawing the flange members 21 of the casing 20 form a circular opening designed to fit the contour of the round or cylindrical casing of a rear axle structure 23.

In order to provide access to the interior of the casing 20 for the tensile member 13 a cut-away portion 24 is provided in the peripheral wall of the casing member. It will be seen that the opening 24 is formed to be placed near the upper portion of the casing when it is mounted in place in enclosing relation to the friction drum. In addition the casing 20 is provided at its lowermost portion with an opening 25 which serves to prevent the accumulation of dust and other foreign material in the casing 20 in operation.

What is claimed is:

1. In a vehicle shock absorbing device of the snubber type, a friction drum formed in sections adapted when assembled to enclose an axle of the vehicle and fit the contour thereof, a tensile member coiled about the drum and attached at its opposite ends to the vehicle framework, a spring interposed in the tensile member, and a casing enclosing the drum member and the portion of the tensile member coiled thereon said casing holding said drum sections about said axle and preventing rotation of said drum.

2. In a vehicle shock absorbing device of the snubber type, a friction drum formed in sections adapted when assembled to enclose an axle of the vehicle and fit the contour thereof, said drum having radially outward extending flanges at its side edges, and a casing for the drum formed to receive the flanges of the drum and to fit the contour of the enclosed axle member, said casing being provided with a cut-away portion in its peripheral wall said casing clamping said drum sections about said axle.

3. In a vehicle shock absorbing device of the snubber type, a friction drum formed in sections adapted when assembled to enclose an axle of the vehicle and fit the contour thereof, said drum having a U-shaped cross section with the flanges extending radially outward, a casing for the drum formed in sections having a U-shaped cross section with the flanges extending inwardly and formed at their margins to fit the contour of the enclosed axle, said casing clamping said drum sections about said axle.

4. In a vehicle shock absorbing device of the snubber type, a friction drum formed in sections adapted when assembled to enclose an axle of the vehicle and fit the contour thereof, said drum having a U-shaped cross section with the flanges extending radially outward, a casing for the drum formed in sections having a U-shaped cross section with the flanges extending inwardly, the flanges of the casing adapted to receive therebetween the flanges of the drum and the inner surfaces of the casing adapted to rest on the peripheral edges of the drum flanges, the free edges of the casing flanges being formed to fit the contour of the enclosed axle, and the casing being provided with a broken-away portion in its upper peripheral wall through which a tensile member may pass and with an opening in its lower peripheral wall to prevent accumulation of dust in the casing, said casing clamping said drum non-rotatively to said axle.

In testimony whereof I affix my signature.

FREDERICK A. GODDARD.